Inventor
Keith Kugler
By Fred Ring
Attorney

May 27, 1958 K. KUGLER 2,836,119
PUMPS
Filed Oct. 29, 1954 3 Sheets-Sheet 3

Inventor
Keith Kugler
By Fred Ong
Attorney

United States Patent Office 2,836,119
Patented May 27, 1958

2,836,119
PUMPS

Keith Kugler, Culbertson, Nebr.

Application October 29, 1954, Serial No. 465,669

1 Claim. (Cl. 103—23)

This invention relates to the field-application of anhydrous ammonia as a fertilizer, and particularly the invention relates to a metering pump for accomplishing accurate and uniform distribution of such fertilizer.

Anhydrous ammonia is used quite extensively as a fertilizer for many farm crops, and this fertilizer is furnished to the farmer in liquid form so as to be under relatively high pressure in the supply tank of the fertilizing unit or implement that is drawn through the field in the fertilizing operation. Such fertilizer is, of course, relatively expensive, and for this and other reasons, it is highly desirable that the fertilizer be applied at a uniform and accurately controlled rate which is usually computed and specified as a selected number of pounds or gallons per acre. By reason of the high pressure of the liquid ammonia, the accurate metering thereof by conventional equipment has been almost impossible of attaining, and it is accordingly the primary object of the present invention to afford a metering pump that may be utilized to attain a metered flow of the liquid fertilizer at any desired rate. More specifically, it is an object of the present invention to afford a metering pump that is simple in structure and operation and which operates with the requisite accuracy of metering despite the high pressures that are involved in the liquid fertilizer that is being metered.

Other and further objects of the present invention will be apparent from the following description and claim and are illustrated in the accompanying drawings which, by way of illustration, show a preferred embodiment of the present invention and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claim.

Figure 1:
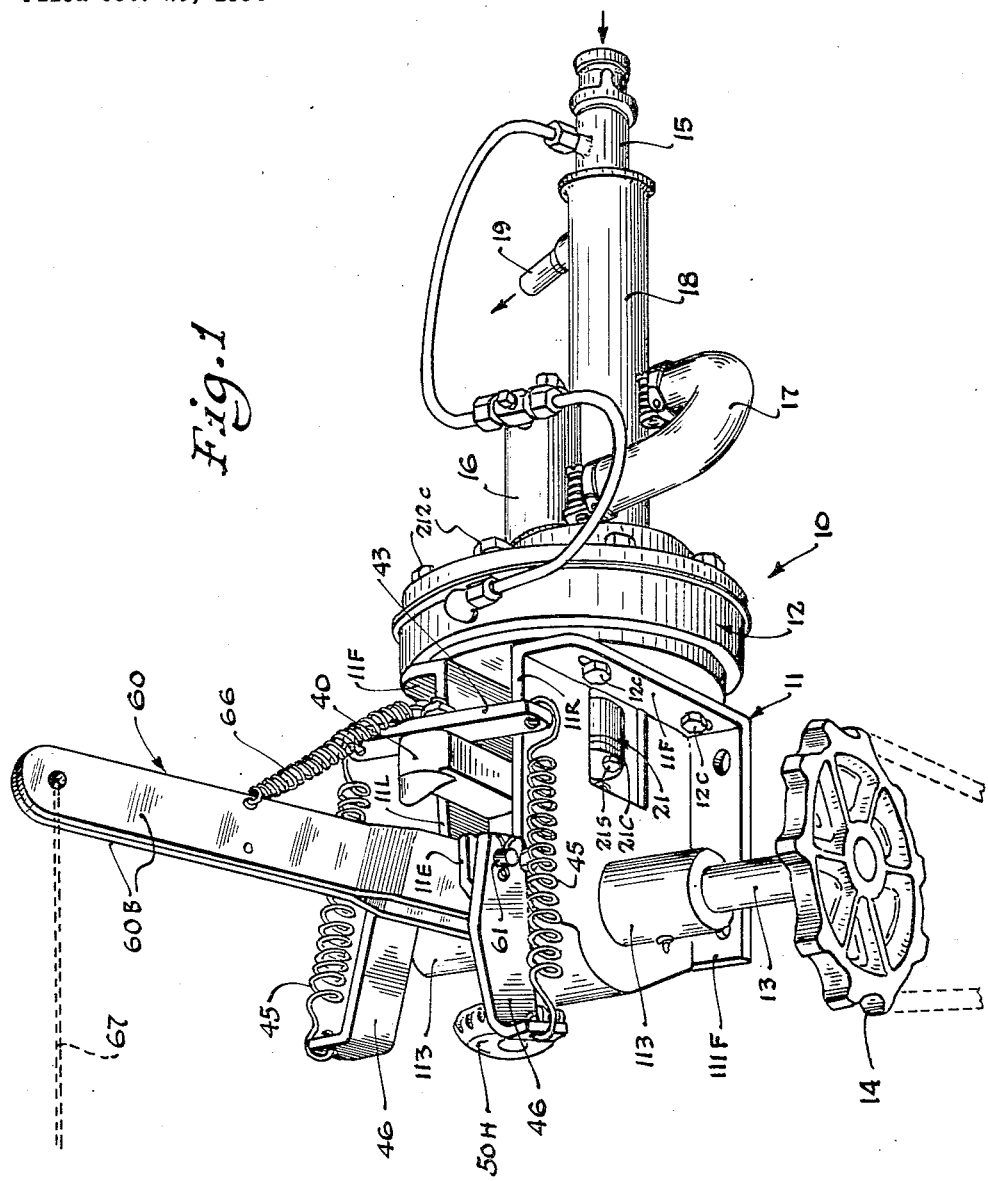
Fig. 1 is a top perspective view of a metering pump embodying the features of the invention.

For purposes of disclosure, the invention is herein illustrated as embodied in a metering pump 10 that has a main frame 11 upon which a diaphragm pump structure 12 is mounted for operation by a main drive shaft 13 which may be driven in timed relation to the movement of a fertilizing implement by connection with a ground wheel of the implement through a means including a sprocket 14. The diaphragm pump mechanism 12 is effective to feed liquid fertilizer from an inlet pipe 15 in metered quantities through an outlet housing 16, a discharge connection 17 and a heat exchanger 18 to a discharge connection or outlet 19, the liquid fertilizer being reduced in its pressure as it leaves the diaphragm pump structure 12 and passing in its gaseous form through the heat exchanger 18 and the outlet 17 to the respective ground engaging elements of the implement, where the fertilizer in gaseous form is discharged into the ground a substantial distance beneath the surface of the ground.

Figure 2:
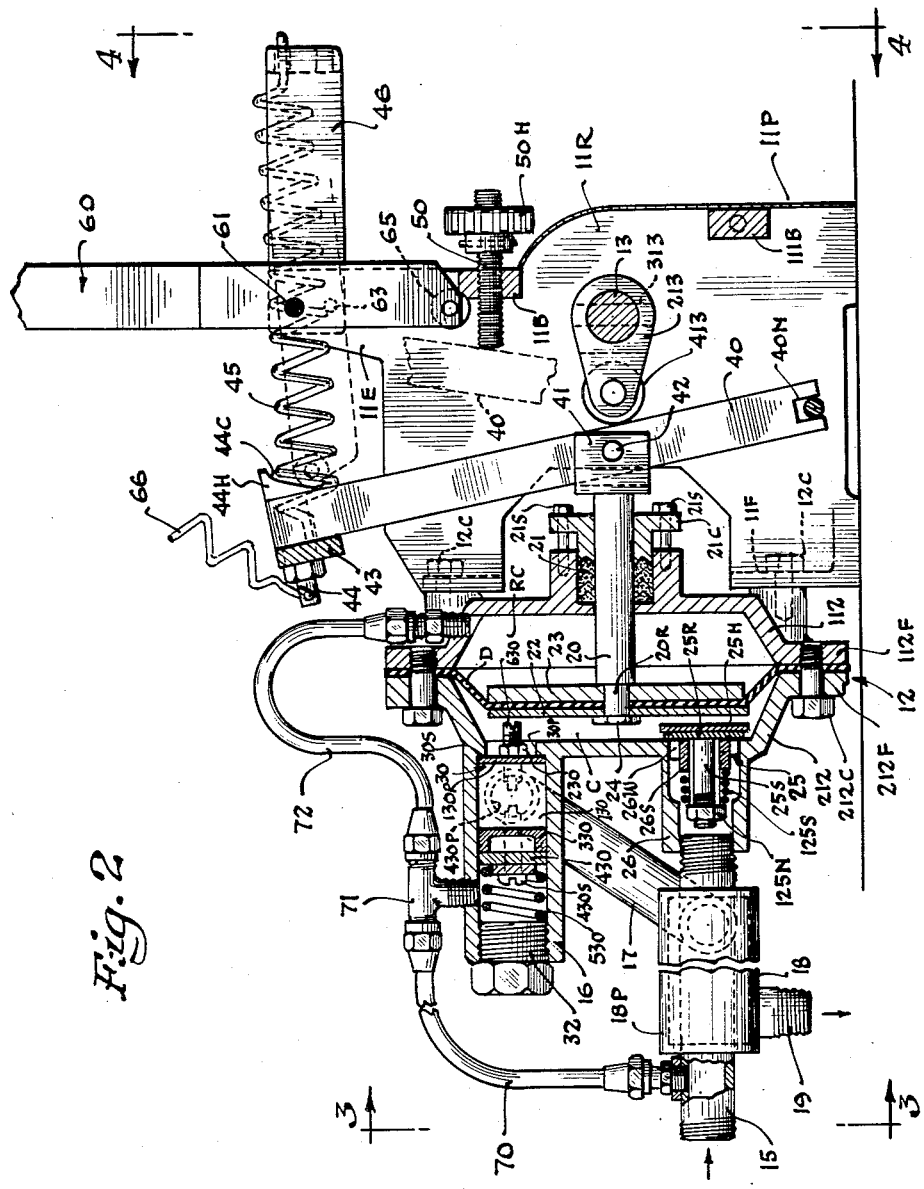
Fig. 2 is a vertical sectional view taken longitudinally through the pump of Fig. 1.

The main frame 11 of the metering pump 10 is afforded by a pair of parallel side plates 11L and 11R that are spaced apart, and at their right-hand ends, as viewed in Fig. 2, are held in rigid spaced relation by cross bars 11B and 111B. Along their lower edges, the side plates 11L and 11R have outwardly extending mounting flanges 11F, while at the ends thereof that are remote from the bars 11B and 111B, the side plates have vertical outwardly extending flanges 11F which serve as part of the means for mounting the diaphragm pump structure 12 on the frame 11. The right end, Fig. 2, of the frame is closed in part by a thin cover plate 11P which for purposes of clarity has been omitted from Fig. 4.

Thus as shown in Figs. 1 and 2, the diaphragm pump structure 12 comprises a pair of cup-shaped members 112 and 212 having angular flanges 112F and 212F at their open ends so that these two flanges may be placed on opposite sides of a flexible diaphragm D to clamp this diaphragm within the diaphragm chamber that is afforded by the two housing sections. The housing section 112 is secured to each of the flanges 11F by means of a pair of cap screws 12C, thus to secure the frame 11 and the diaphragm pump housing securely together, and this also serves to hold the side plates 11L and 11R in the proper spaced relation at the end thereof adjacent the diaphragm pump housing. The flanges 112F and 212F are clamped together and against the bordering edge of the diaphragm D by means of a plurality of cap screws 212C.

The central portion of the diaphragm D is operatively connected to the end of a reciprocable piston rod 20 which extends slidably through the vertical wall of the housing section 112 and through a packing gland 21 which may be of any conventional kind. In the present instance, the packing of the gland 21 is compressed and held in position by a cap 21C and cap screws 21S. Within the pump housing, the end of the piston rod 20 is reduced as at 20R, and a pair of plates 22 and 23 disposed on opposite sides of the central portion of the diaphragm D are positioned on the reduced portion 20R, and are held in position and clamped on the diaphragm by means of a cap screw 24 that extends axially into the piston rod 20.

The diaphragm pump is operated by reciprocation of the piston rod 20 as will be described, and in such reciprocation, the liquid fertilizer under pressure is admitted from the inlet pipe 15 through an inlet valve 25 into the pump chamber that is afforded between the wall of the casing 212 and the diaphragm D, this pump chamber being indicated generally by the reference character C in Fig. 2 of the drawings. The inlet valve 25 may be of any conventional construction, but as herein shown is afforded within a projecting sleeve 26 that is formed on the vertical wall of the housing section 212 and which is connected to the other end of the inlet pipe 15, as shown in Fig. 2. Within this sleeve 26, a guide sleeve 26S is supported by a plurality of webs 26W so as to receive and guide the sleeved stem 25S of the valve member 25 having a head 25H and a resilient surfacing 25R that engages the internal surface of the vertical wall about the valve passage to close the inlet valve. The valve member is urged toward its closed position by means of an expansive coil spring surrounding the stem 25S and acting between the adjacent end of the sleeve 26S and a nut 125N on the valve stem, thus to urge the valve member to the left toward its closed position, as viewed in Fig. 2 of the drawings.

The charge of liquid fertilizer that enters the pump chamber C in the intake stroke of the diaphragm is discharged from the pump chamber C through a discharge valve 30 that is mounted within the extending mounting sleeve 16 that is formed on the casing section 212 parallel to the sleeve 26 and also parallel to the piston rod 20. As shown in Fig. 2 of the drawings, the sleeve 16 is capped or closed at its outer end by a screw plug 32 and at its inner end has an outlet port 30P that is of a smaller diameter than the internal diameter of the sleeve 16 so as to afford a shoulder or valve seat 30S. Within the sleeve, a solid cylindrical valve member 130 is slidably mounted and has a resilient disk 130P at its right-hand end, as viewed in Fig. 2, for contact with the shoulder or seat 30S to close the valve. This resilient member 130D is held in position by a cap screw 230. At its other end, the valve body 130 has a conventional cup leather 330 secured thereon by means including a washer 430 and a fastening screw 430S. To the left of the washer 430, an expansive coil spring 530 acts between the plug 32 and the washer 430 to urge the valve member 30 toward its right-hand or closed position. When pressure is applied to the outlet valve 30 in the discharge stroke of the diaphragm D, the valve member 30 is moved to the left in an amount sufficient to disclose a final outlet port 430P that opens laterally into the connecting passage 17, and upon completion of the discharge stroke and initiating of the withdrawing or intake stroke of the diaphragm, the outlet valve 30 is returned to its closed position by the spring 530.

As hereinbefore pointed out, the liquid fertilizer undergoes an expansion or pressure reduction in the course of the metering operation, so that as this metered fertilizer moves into the heat exchanger 18, it is at a substantially reduced temperature so as to cause a heat transfer action which lowers the temperature of the incoming liquid fertilizer that is moving through the intake pipe 15. In this respect, it will be noted that the heat exchanger 18 as herein shown is afforded by a pipe 18P that surrounds the intake pipe 15 for a substantial distance and is closed at its ends, the passage 17 being connected to the right-hand end portion of the pipe 18P, while the outlet 19 is connected to the other or left-hand end of the pipe 18P. The cool gaseous fertilizer thus flows along the intake pipe 15 so as to absorb heat from the incoming liquid refrigerant.

Figure 4:
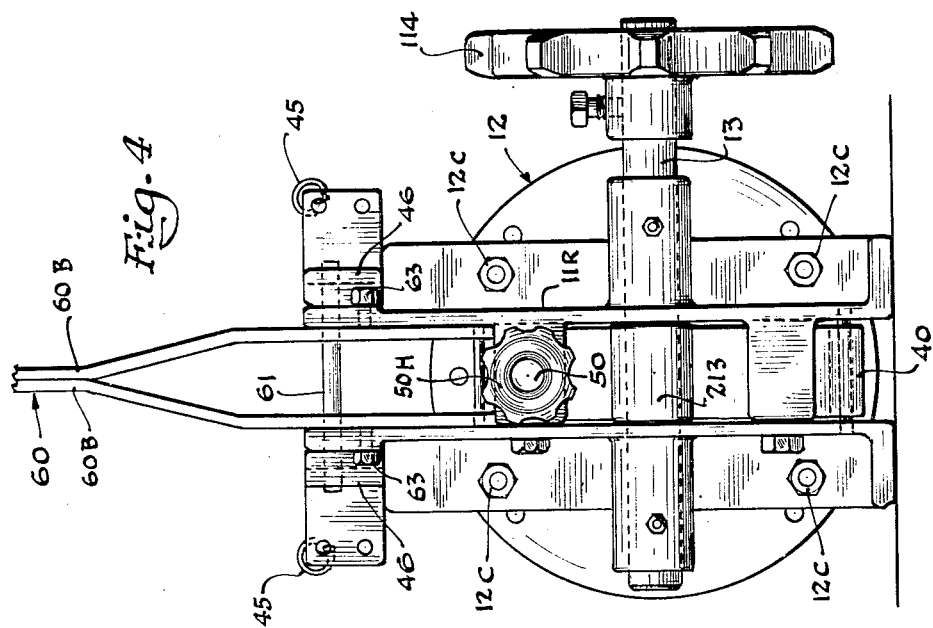
Fig. 4 is a right-hand elevational view taken substantially along the line 4—4 of Fig. 2.
Figure 3:
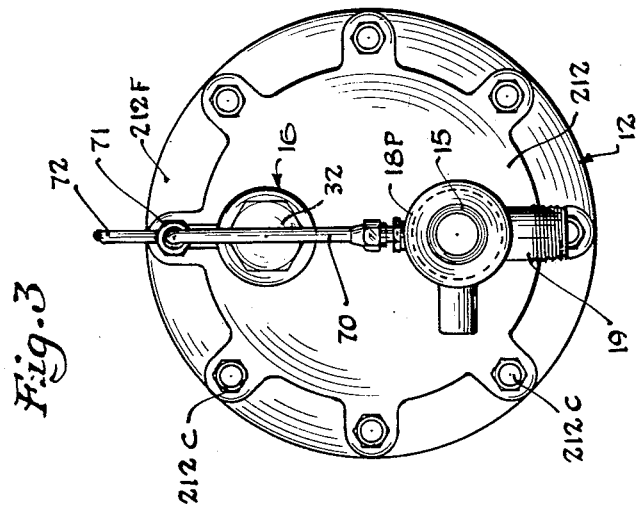
Fig. 3 is a left-hand end elevational view taken from the line 3—3 of Fig. 2.

The main drive shaft 13 is rotatably mounted in a pair of bearings 113 that are extended outwardly from the respective side plates 11L and 11R, and in the space between the two side plates, means are afforded whereby the piston rod 20 may be actuated. Thus, as shown in Figs. 2 and 4, an operating lever 40 has a notch 40N at its lower end that embraces cross pin 40P between the two side plates 11L and 11R, and this lever 40 extends upwardly and between opposite sides of a connecting block 41 that is fixed to the right-hand end of the piston rod 20, as shown in Fig. 2. The lever 40 is pivoted to the block 41 by a cross pin 42 that extends through the lever and through the opposite side members of the block 41. At its upper end, the lever 40 has a cross bar 43 secured thereto by means including a bolt 44. At its opposite ends, the cross bar 43 has coil springs 45 secured thereto and extended to the right in Fig. 2 and connected to stationary bracket arms 46 that are fixed to the respective side plates as will be described. The springs 45 yieldingly urge the lever 40 in a clockwise direction, as viewed in Fig. 2, so as to tend to move the diaphragm D through its return or intake stroke, the extent and limit of which is determined by abutment of the arm 40 with an adjustable screw 50 that extends through the cross bar 11B as shown in Fig. 2 of the drawings and has an operating head 50H pinned thereto. The piston rod 20 is positively moved in a left-hand or pumping direction, Fig. 2, by means mounted upon the drive shaft 13, and in the present form such means are afforded by an arm 213 pinned as at 313 on the shaft 13 between the side plates of the frame, and having a freely rotatable roller 413 mounted on the end of the arm 213 so that it may engage the adjacent surface of the lever 40. Such engagement moves the piston rod 20 in a left-hand or pumping direction, Fig. 2, and controls the right-hand or intake movement of the piston rod until the lever 40 engages the adjustable abutment afforded by the screw 50.

The operating shaft 13 is in most instances continuously operated during movement of the implement upon which the pump is mounted, and means are therefore provided for disabling the operating means of the pump. In the present instance, this is attained by moving the lever 40 in a counter-clockwise direction to a point where it is out of the path of the roller 413. This is accomplished by means including a control lever 60 that is made up of two bars 60B that are engaged in a face-to-face relation in their upper portion, and which are spread apart in their lower portion to afford a bifurcated lower end portion. The lever 60 is pivoted by a cross pin 61 that extends through upwardly projecting ears 11E that are formed on the respective side plates 11R and 11L, and it might be pointed out that this pivot pin 61 constitutes one fastening element that functions in holding the bars 46 in position. Each bar 46 also has a screw 63 extended therethrough into the adjacent ear 11E, thus to complete the rigid fastening of the bars 46 on the frame elements. At its lower end, the lever 60 has a roller 65 rotatably mounted between the plates 60B that make up the lever 60. The control lever 60 is normally urged by a spring 66 in a counter-clockwise direction, Fig. 2, to a normal position wherein the roller 65 engages the cross bar 11B, and when the pump is to be disabled or stopped, the control lever 60 is pivoted in a clockwise direction, Fig. 2, until the roller 65 engages the adjacent surface of the lever 40 and moves toward a cam surface 44C that is formed on the head 44H of the bolt 44. Such movement of the control lever 60 may readily be accomplished by means of a cord or chain 67 that is indicated diagrammatically in Fig. 1 of the drawings, such cord or chain extending from the upper end of the lever 60 to the operator's seat on the implement or on the tractor that is pulling such implement.

In the use of a liquid fertilizer such as anhydrous ammonia, the pressure of the liquid in the supply tank and in the chamber C of the pump may be anywhere from 60 to 200 pounds per square inch, and in order to eliminate the need for excessively heavy springs in the valves and in the return actuation of the diaphragm, equalizing connections are afforded in the pump. Thus, an equalizing pipe 70 is connected to the intake pipe 15 and to one arm of a T-fitting 71 that is connected to the sleeve 21 to the left of the outlet valve member 30. A connection 72 is extended from the other arm of the T-fitting 71 to the rear chamber RC of the pump housing, thus to apply the intake pressure of the fertilizer back of the diaphragm D and back of the outlet valve 30.

In handling liquid fertilizer of the aforesaid character, it is desirable to vent the pump chamber C when the pump is not in use, and in the present instance this is accomplished by operation of the control lever 60. Thus the valve member 30 has an adjustable screw 630 extending therefrom and into the chamber 30C. The length of the abutment screw 630 is such that normal actuation of the piston rod 20 will not cause the plate 22 to engage the abutment screw 630. However, when the control lever 60 is moved to its effective position, the roller 65 may be moved upwardly along the cam surface 44C to an amount sufficient to engage the plate 22 with the abutment screw 630 and move the valve member 30 to the left, Fig. 2, in an amount sufficient to disengage the valve member 30 from its seat 30S. When this is done, any gaseous fertilizer within the pump chamber C may escape therefrom.

From the foregoing description, it will be apparent that the present invention affords a metering pump that is simple in character and effective in operation, and that by the use of the present metering pump, the application of liquid fertilizer to a field may be accurately and adjustably controlled.

Thus while I have illustrated and described the preferred embodiment of my invention, it is to be understood that this is capable of variation and modification, and I therefore do not wish to be limited to the precise details set forth, but desire to avail myself of such changes and alterations as fall within the purview of the following claim.

I claim:

In a metering pump for use in applying liquefied gaseous fertilizer, a frame, a housing mounted on said frame and having reciprocable means mounted therein to provide a pump, an operating rod slidably extended into said housing and connected to said reciprocable means, a pivotal operating lever operatively connected to said rod for moving said reciprocable means through suction and discharge stroke, spring means acting on said lever for moving the reciprocable means through its suction stroke, an adjustable abutment in the path of said lever for limiting and varying said suction stroke, a drive shaft having eccentric means thereon engageable with said operating lever for actuating the reciprocable means through its discharge stroke, inlet and outlet check valves, means engageable by said reciprocable means when moved beyond the end of its discharge stroke for opening said outlet check valve, and a control lever normally disposed in an ineffective position and pivotable to an effective position wherein it engages said actuating lever to hold said actuating lever out of the range of said eccentric means, and said control lever being movable beyond said effective position to move said reciprocable means beyond the end of its discharge stroke.

References Cited in the file of this patent

UNITED STATES PATENTS

| | | |
|---|---|---|
| 2,367,545 | Udale | Jan. 16, 1945 |
| 2,696,785 | Blue | Dec. 14, 1954 |
| 2,761,391 | Johnston | Sept. 4, 1956 |